United States Patent [19]
Bergman

[11] 3,843,938
[45] Oct. 22, 1974

[54] GATED CLOCK MULTIVIBRATOR

[75] Inventor: David L. Bergman, Inyokern, Calif.

[73] Assignee: The United States of America as represented by the Secretary of the Navy, Washington, D.C.

[22] Filed: Mar. 9, 1973

[21] Appl. No.: 340,612

[52] U.S. Cl. .............. 331/108 D, 307/273, 331/111
[51] Int. Cl. .............................................. H03b 5/24
[58] Field of Search ............ 331/108 C, 108 D, 111; 307/273, 276

[56] References Cited

UNITED STATES PATENTS

| | | | |
|---|---|---|---|
| 3,395,362 | 7/1968 | Sutherland | 331/111 |
| 3,512,106 | 5/1970 | Rosenthal | 331/111 |
| 3,680,003 | 7/1972 | Walker | 331/111 |

OTHER PUBLICATIONS

Electronic Enginner, May 1970, p. 55.
Electronic Design, July 4, 1968, p. 102.

*Primary Examiner*—John Kominski
*Attorney, Agent, or Firm*—R. S. Sciascia; Roy Miller; R. F. Beers

[57] ABSTRACT

An astable multivibrator in combination with a NOR gate comprising both a gated clock and a nonretriggerable one-shot multivibrator. The multivibrator has first and second NOR gates. The signal between the first and second NOR gates is transmitted to the input of an external NOR gate and the output from the external NOR gate is transmitted ot the input of the first NOR gate of the multivibrator. A modification of the invention includes gating means connected to the multivibrator and the input of the circuit making the circuit a retriggerable one-shot. multivibrator.

5 Claims, 6 Drawing Figures

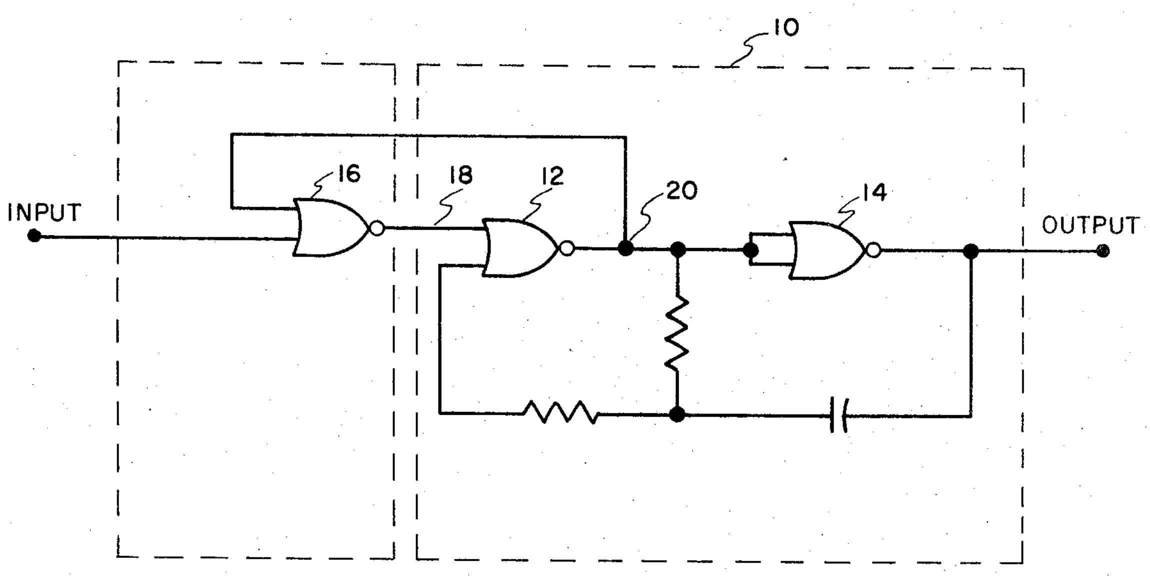
Fig. Ia
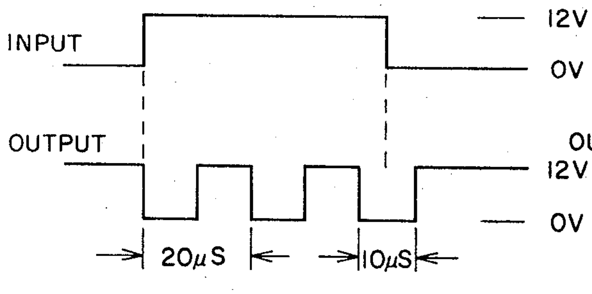
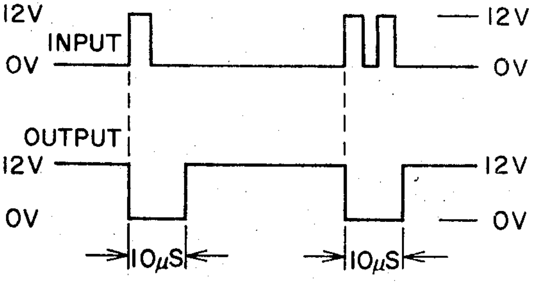
Fig. Ib
Fig. Ic

GATED CLOCK MULTIVIBRATOR

BACKGROUND OF THE INVENTION

In prior devices the circuit is designed for its intended application such as a gated clock, nonretriggerable one-shot or a retriggerable one-shot. The circuit of the present invention has the capability of operating as any one of the three aforementioned devices. Furthermore, the entire circuit may be placed on one chip.

SUMMARY OF THE INVENTION

The invention comprises an electrical circuit including an astable multivibrator, a NOR gate and switching means. The NOR gate receives a feedback signal from the multivibrator and also from the switching means when the switching means is in an operating mode. The circuit has the capability of operating as a gated clock, a nonretriggerable one-shot or a retriggerable one shot.

BRIEF DESCRIPTION OF THE DRAWINGS

FIG. 1*a* is a circuit diagram of a first embodiment of the invention;

FIGS. 1*b* and 1*c* indicate the input and output waveforms of the circuit of FIG. 1*a;*

DESCRIPTION OF THE PREFERRED EMBODIMENTS

Figure 2:
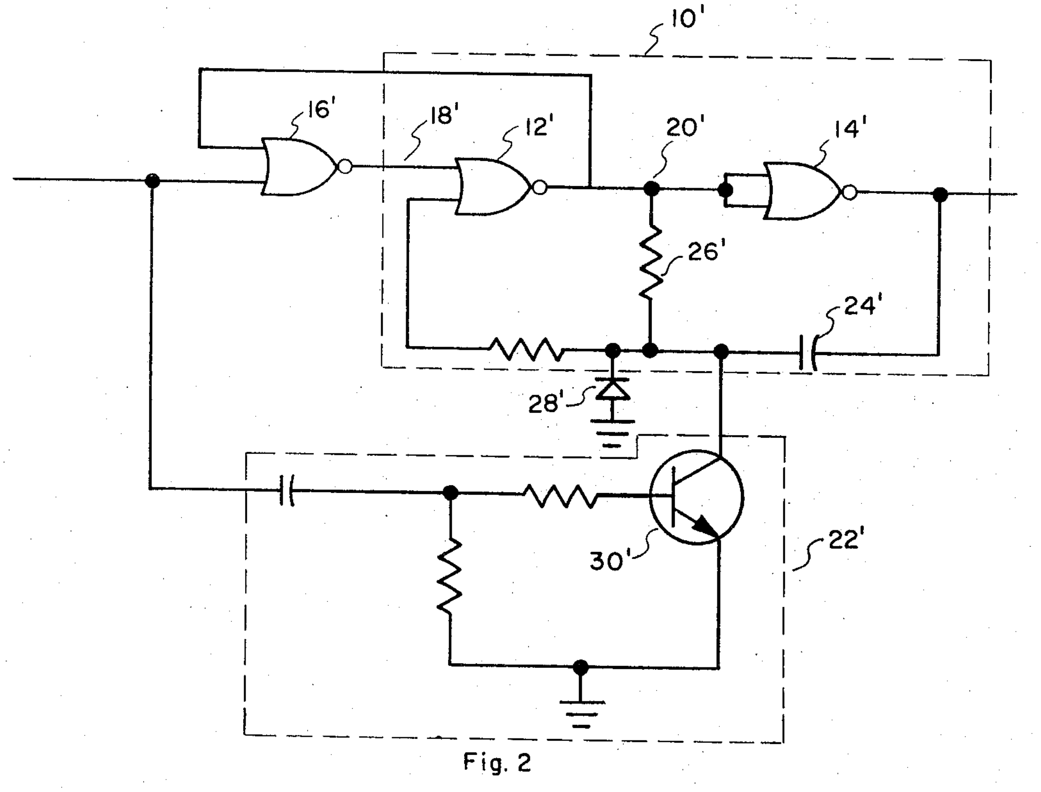
FIG. 2 is a circuit diagram of the second embodiment of the invention.

In FIG. 1*a* is seen multivibrator 10 including NOR gates 12 and 14. The output of NOR gate 16 is coupled to an input of NOR gate 12 and the output of NOR gate 12 is coupled to an input of NOR gate 16.

Adding one more NOR gate to an astable multivibrator ensures that the last pulse is completed instead of being prematurely terminated by the gating signal. Pulses appear at the output terminal whenever the gating signal is high (+12 VDC). When the gating signal is high, junction 18 is low (0 VDC), allowing the multivibrator to generate output pulses as seen in FIG. 1*b.* When junction 18 is high, the multibrator is inhibited and there are no output pulses. If the gating signal becomes low during an output pulse, the positive voltage at 20 which is fed back to an input of gate 16 keeps point 18 low, allowing completion of the pulse. The circuit shown oscillates typically at 50 KHz. RCA integrated circuit No. CD4001 (Quad 2 input NOR gate) is used.

The circuit of FIG. 1*a* can also function as a one-shot multivibrator. When short pulses are applied to an input of gate 16, the output is a pulse of fixed pulse width (FIG. 1*c*). The output pulse width is 10 microseconds for this particular circuit. The ability of the circuit to complete a pulse is what makes it a one-shot multivibrator. This circuit is a non-retriggerable one-shot multivibrator. A second input pulse will not affect the circuit unless the circuit has completed processing the first pulse.

Figure 4:
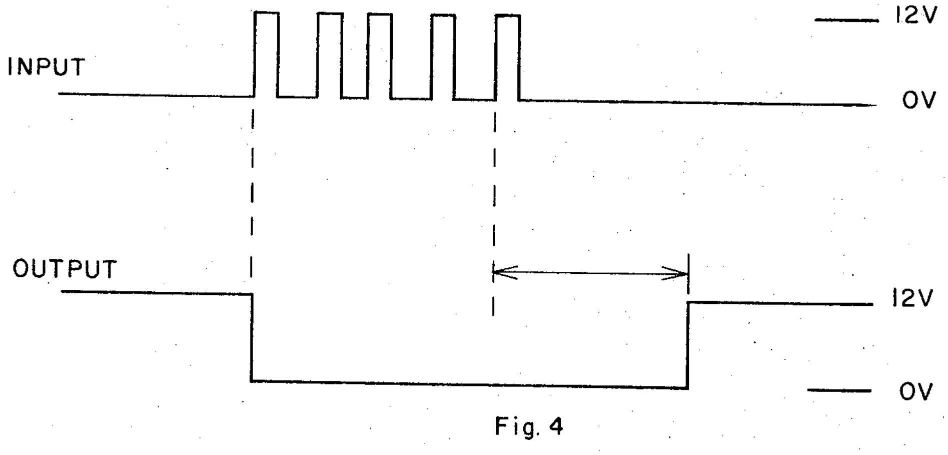
FIG. 4 shows the waveforms for the input and the output of the circuits of FIGS. 2 and 3.

The addition of transistor stage 22' makes the circuit a retriggerable one-shot multivibrator. Such a circuit is shown in FIG. 2. The output pulse width of this circuit is typically 1.5 milliseconds. For the retriggerable one-shot multivibrator, the output pulse will extend 1.5 milliseconds after the last pulse received at the input (FIG. 4). Operation of the circuit depends upon charging capacitor 24' through resistor 26'. When the capacitor has charged long enough to reach the threshold voltage of NOR gate 12' the circuit switches states. With transistor 30' added, however, each input pulse turns on the transistor momentarily, capacitor 24' is discharged to ground potential and the 1.5 millisecond charging period is started from the time when the last input pulse occurred. Diode 28' serves to enhance the timing accuracy of the retriggerable one-shot multivibrator. The diode ensures that the retriggered output interval is the same whether the output period is initiated by the first input pulse or extended by succeeding input pulses. Diode 28' achieves this by causing the start of the timing waveform voltage to always be near zero volts and by preventing a negative voltage.

Figure 3:
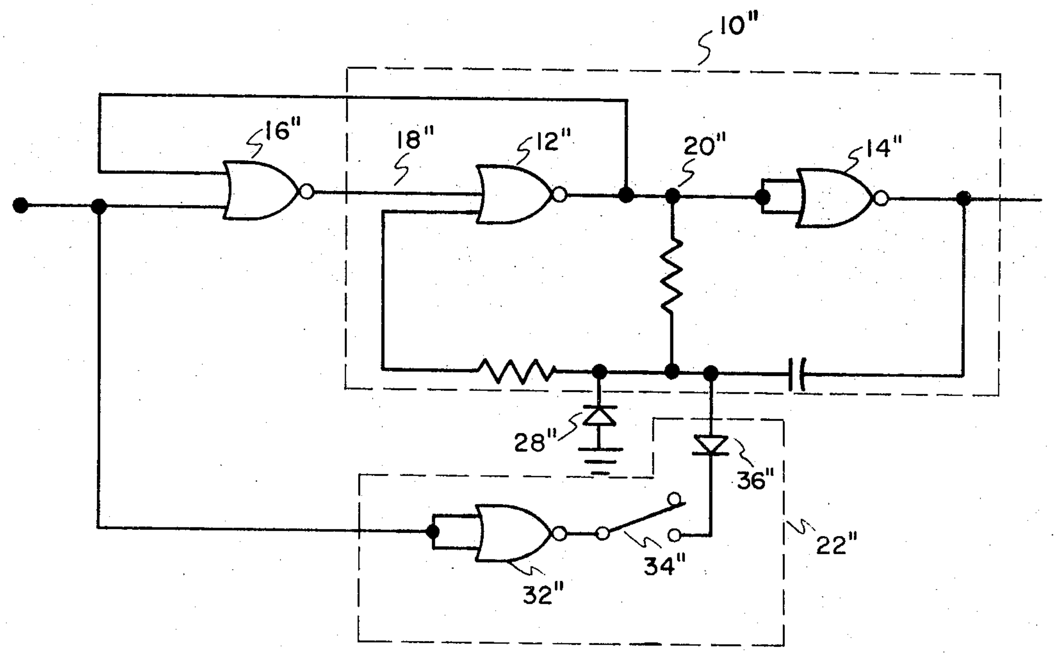
FIG. 3 is a circuit diagram of the third embodiment of the invention.

A second modification of the invention is seen in FIG. 3. The transistor stage 22' of FIG. 2 has been replaced by NOR gate or inverter 32'', switch 34'' and diode 36''. With switch 34'' in the open position the circuit acts as a normal one-shot multivibrator or a gated multivibrator like the circuit of FIG. 1*a.* With gate 34'' closed, the circuit acts as a retriggerable one-shot multivibrator. The remaining corresponding elements 12', 14', 16', 18', 20', 28' and 12'', 14'', 16'', 18'', 20'', 28'' of FIGS. 2 and 3 respectively are identical.

What is claimed is:

1. A pulse generating circuit comprising:

astable multivibrator including a first and second logic elements each having two inputs and a single output, said first logic element having its output electrically coupled to the two inputs of said second logic element;

output terminal means electrically coupled to the output of said second logic element;

first feedback network electrically coupled to feed an electrical signal from the output of said second logic element to an input of said first and second logic elements;

third logic element having two inputs and a single output, said third logic element having its output electrically coupled to one of the inputs of said first logic element;

an electronic gating means electrically coupled from said first feedback network to the input of said third logic element;

input terminal means electrically coupled to one of the input terminals of said third logic element for receiving a pulse input signal;

second feedback means electrically coupling the output signal of said first logic element to one of the inputs of said third element;

whereby an input pulse of predetermined time duration at the input of the third logic element allows the astable multivibrator to generate output pulses of equal time duration during the time period of the input pulse.

2. The device of claim 1 wherein said elements are NOR gates.

3. The pulse generating circuit of claim 1 wherein said first feedback network comprises:

a timing circuitry.

4. The device of claim 1 wherein said gating means comprises:

a transistor, having a base, emitter and collector electrodes;

said collector electrode of said transistor being electrically coupled to said first feedback network;

said emitter electrode of said transistor being electrically coupled to circuit ground potential; and said base electrode of said transistor being coupled serially through resistor and capacitor elements to the input of said third logic element.

5. A pulse generating circuit comprising:

astable multivibrator including a first and second logic element each having two inputs and a single output, said first logic element having its output electrically coupled to the two inputs of said second logic element;

output terminal means electrically coupled to the output of said second logic element;

first feedback network electrically coupled to feed an electrical signal from the output of said second logic element to one of inputs of said first and second logic elements;

third logic element having two inputs and a single output, said third logic element having its output electrically coupled to one of the inputs of said first logic element;

input terminal means electrically coupled to one of the input terminals of said third logic element for receiving a pulse input signal;

second feedback means electrically coupling the output signal of said first logic element to one of the inputs of said third logic element;

an inverter having its input coupled to said input terminal means and its output coupled to a switch; and a diode having an anode coupled to said first feedback network and having its cathode coupled to said switch.

* * * * *